Aug. 4, 1931.  P. B. SHEE  1,817,465
SEPARATOR
Filed April 5, 1930
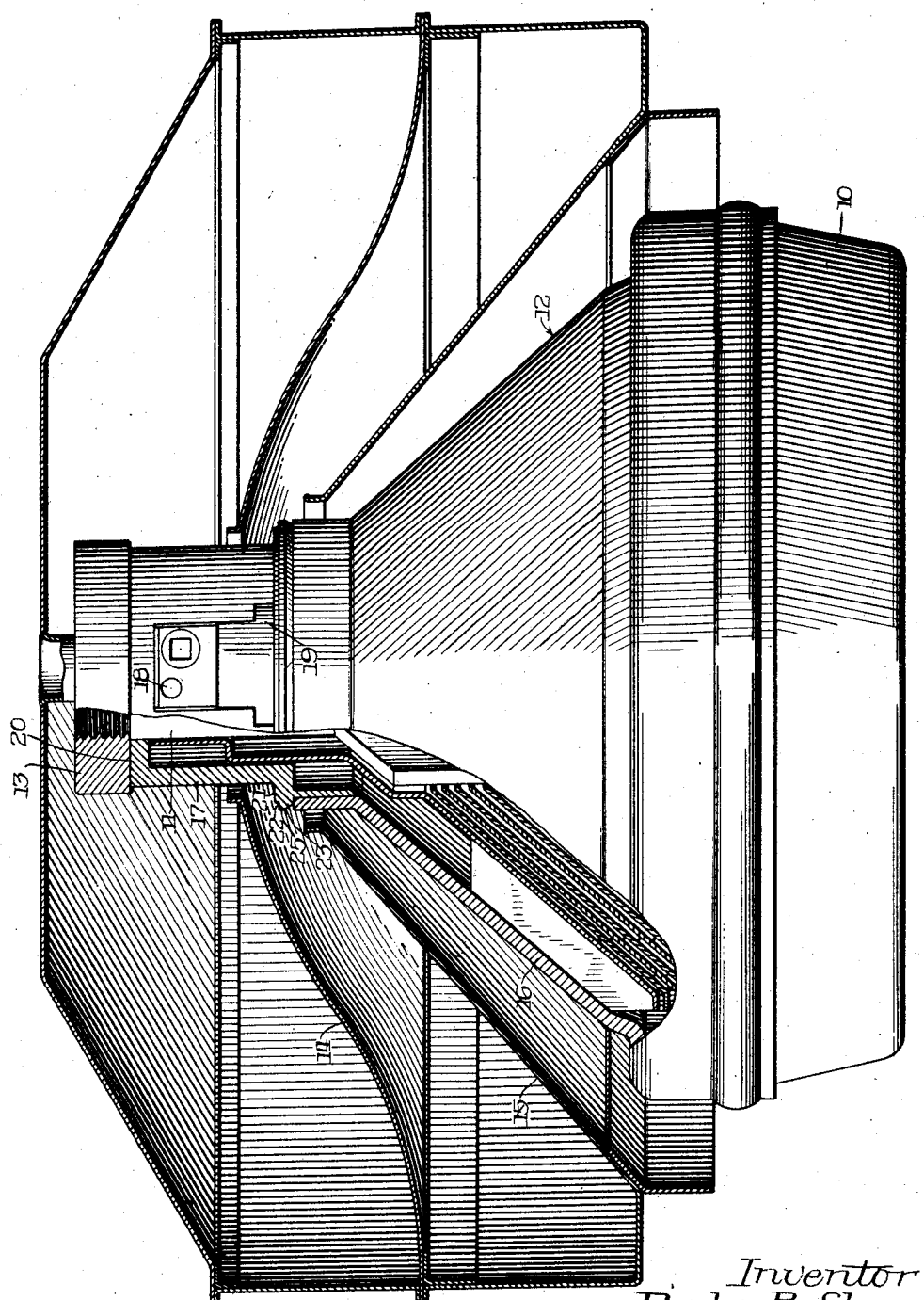
Inventor:
Parke B. Shee
By Chindahl, Parker & Carlson
attys Patented Aug. 4, 1931

1,817,465

UNITED STATES PATENT OFFICE

PARKE B. SHEE, OF OAK PARK, ILLINOIS, ASSIGNOR TO SEARS, ROEBUCK AND CO., OF CHICAGO, ILLINOIS, A CORPORATION OF NEW YORK

SEPARATOR

Application filed April 5, 1930. Serial No. 441,788.

The invention relates generally to centrifugal separators and more particularly to the bowl assembly of such separators.

The general object of the invention is to provide a bowl having a cover which prevents any of the liquid, in leaving the outlet in the cover, from passing elsewhere than into its pan.

Another object of the invention is to provide a bowl cover having a plurality of surfaces from which the liquid will be thrown off the bowl cover into its pan before it can run down the sides of said cover past said pan.

A further object is to provide a bowl cover having great strength and rigidity and capable of resisting the stress exerted thereon without distortion when it is clamped in the bowl assembly and rotated at a high speed.

Other objects and advantages will become apparent from the following description taken in connection with the accompanying drawing, in which:

The figure shows a fragmentary elevational view partly in section of a centrifugal separator embodying the features of my invention.

While the invention is susceptible of various modifications and alternative constructions, I have shown in the drawing and will herein describe in detail the preferred embodiment, but it is to be understood that I do not thereby intend to limit the invention to the specific form disclosed but intend to cover all modifications and alternative constructions falling within the spirit and scope of the invention as expressed in the appended claims.

In a centrifugal separator, a bowl assembly is provided which is adapted to be rotated at a high speed by a vertical drive shaft, the bowl being adapted to be seated on the upper end of said shaft.

While the invention is adapted for separating the lighter and heavier constituents of various liquids, for purposes of clarity it is described herein as being used for separating cream and skim-milk.

As illustrated herein, the bowl assembly comprises a bowl 10 and a stem 11 projecting centrally upward from the bottom thereof. A bowl cover indicated generally at 12 forms a closure for the bowl 10 and is seated thereon. A nut 13 is threaded to the upper end of the stem 11 and clamps the cover 12 in place. Overlying the cover 12 are a cream pan 14 and a skim-milk pan 15 adapted to receive the cream and skim-milk respectively as they issue from the bowl.

The cover 12 comprises a relatively thin conical section 16 made of drawn metal and having a cylindrical portion at its upper end, and a separate neck portion 17 made of thick turned metal having a shoulder or transverse flange abutting against the cylindrical portion of the conical section 16 and a skirt fitting snugly within and attached to the cylindrical portion of the conical section 16. The neck portion 17 is provided with a cream outlet 18 and a skim-milk outlet 19 positioned opposite annular openings in the respective pans 14 and 15. The upper end of the neck portion 17 has an inturned flange 20 whose inner edge fits snugly around the stem 11 to hold the cover concentric with the stem, the flange 20 forming a shoulder against which the nut 13 abuts in clamping the cover in place.

When the skim-milk issues from its outlet 19, the bulk of it is thrown tangentially outward from the neck portion 17 and into the annular opening in the skim-milk pan 15 because of the rotation of the bowl assembly, but some of the skim-milk will have a tendency to adhere to the side of the cover and run down past the skim-milk pan 15.

To prevent such running, the neck portion 17 is provided with radially extending means below the skim-milk outlet forming a relatively sharp annular edge from which the centrifugal force throws off any such milk. As illustrated in the drawing, the radially extending means comprises a pair of upwardly facing annular shoulders 21 and 22, the lower shoulder 22 being the larger. Below the lower shoulder 22, the neck portion 17 is cut back to a smaller diameter than that of said shoulder, as shown at 23.

In operation, any skim-milk tending to adhere to the side of the cover will run out along the upper shoulder 21 to the relatively sharp outer edge thereof, where the centrifugal force will cause it to be thrown off. But, if any of the milk continues to adhere to the side and to run down, it will be caught on the lower shoulder 22 where a similar action takes place. If any of the milk still adheres and tends to run down below the shoulder 22, the centrifugal force will directly oppose the tendency of the milk to run inwardly toward the portion of smaller diameter 23, and the milk will be thrown off. Thus, an annular ridge 25 is formed which has a greater diameter than portions immediately above and below said ridge, the centrifugal force on the milk reaching the ridge 25 exceeding the tendency of the milk to adhere to the side.

From the above description, it is evident that I have provided a bowl having a cover which prevents any of the skim-milk, in leaving the outlet in the cover, from passing elsewhere than into the skim-milk pan. It is also evident that I have provided a bowl cover which has great strength and rigidity and is capable of resisting, without distortion, the stress exerted thereon, when it is clamped in the bowl assembly and is rotated at a high speed.

I claim as my invention:

1. In a bowl assembly of a centrifugal separator, a bowl cover constructed in two pieces, one piece comprising a relatively thin conical section made of drawn metal and having a cylindrical portion at its upper end, the other piece comprising a cylindrical section made of thicker turned metal and having an outlet and a transverse flange abutting against the cylindrical portion of said first piece, and a skirt depending therefrom and fitting snugly within and attached to said cylindrical portion, the flange of said second piece having a pair of relatively wide sharp-edged shoulders cut therein below said outlet from which liquid tending to run down the side of said cover will be thrown off by the centrifugal force.

2. In a centrifugal separator, a bowl cover comprising a conical section made of drawn metal, and a neck portion made of thicker turned metal, said neck portion having an outlet and an annular ridge below said outlet and of a greater diameter than the portions of said cover immediately above and below said ridge, said ridge forming relatively sharp edges at which the centrifugal force exerted on any liquid tending to run down the side of said cover will exceed the tendency of said liquid to adhere to said side thereby causing said liquid to be thrown off from said cover.

In testimony whereof, I have hereunto affixed my signature.

PARKE B. SHEE.